N. E. SMITH.
Wheel Cultivator.

No. 39,686. Patented Aug. 25, 1863.

Witnesses:
J. W. Coombs
G. W. Reed

Inventor:
N. E. Smith
per Munn & Co
attys

UNITED STATES PATENT OFFICE.

N. E. SMITH, OF SPRINGDALE, IOWA.

IMPROVEMENT IN CULTIVATORS.

Specification forming part of Letters Patent No. 39,686, dated August 25, 1863.

*To all whom it may concern:*

Be it known that I, N. E. SMITH, of Springdale, in the county of Cedar and State of Iowa, have invented a new and Improved Corn-Cultivator; and I do hereby declare that the following is a full, clear, and exact description of the same, reference being had to the accompanying drawings, making a part of this specification, in which—

Figure 1:
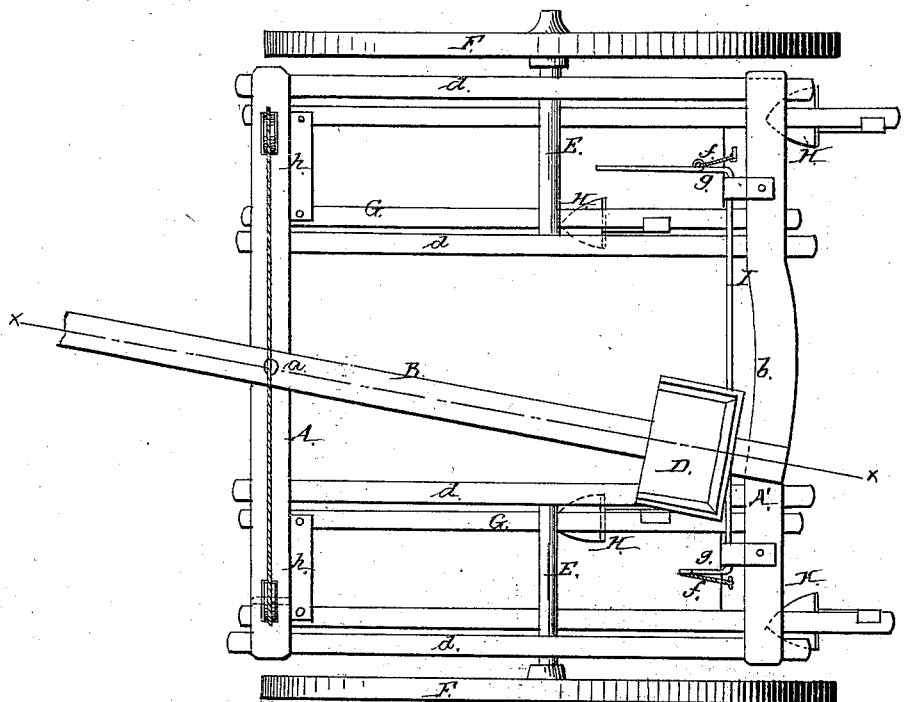
Figure 2:
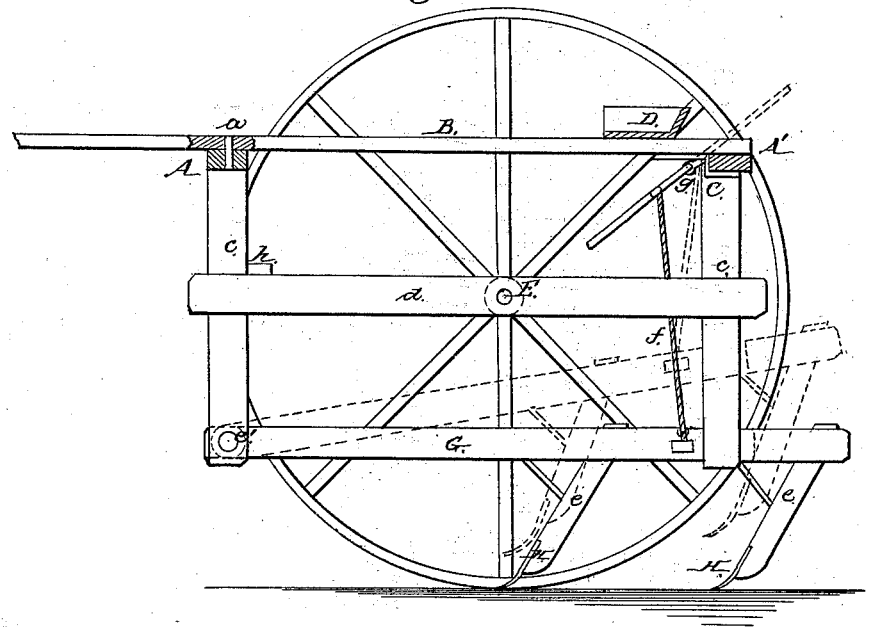

Figure 1 is a plan or top view of my invention; Fig. 2, a side sectional view of the same, taken in the line $x\,x$, Fig. 1.

Similar letters of reference indicate corresponding parts in the two figures.

The object of this invention is to obtain a corn-cultivator of simple construction which will admit of being readily turned by the driver and manipulated generally with the greatest facility, as hereinafter fully shown and described.

To enable those skilled in the art to fully understand and construct my invention, I will proceed to describe it.

A A' represent two bars, the front one, A, of which has a draft-pole, B, attached to it by a pivot-bolt, $a$. The back end of the draft-pole rests on the bar A', the central part, $b$, of which is of curved or segment form, as shown in Fig. 1. The back part of the draft-pole has a metal plate, C, attached to it, which plate bears against the bar A' and extends underneath it, as shown in Fig. 2. On the back part of the draft-pole the driver's seat D is placed. The bars A A' have each pendants $c$ attached to them—four to each bar and two near each end—and to these pendants horizontal parallel bars $d$ are attached, in which the axles E of the wheels F are placed. (See Fig. 1.)

Between the lower parts of the pendants $c$ there are fitted frames G, of rectangular form, and having standards $e$ attached to them, to which plows H are secured. The front ends of the frames G are fitted loosely on rods $e'$, to admit of the back parts of said frames being raised and lowered, and this is effected by having cords or chains $f$ attached to the frames G and extending up to arms $g$ on a shaft, I, which has its bearings attached to the shaft A'.

As the machine is drawn along the driver can readily guide it by moving or shifting the draft-pole B, which is done by shifting the back end of the draft-pole by means of the feet, which rest or bear against cross-strips $h\,h$, attached to the bars $d$. This moving or shifting of the draft-pole B on its pivot places the machine under the complete control of the driver. It may be turned or guided almost instantly, as the direction of the line of draft relatively with the machine is changed with the shifting or changing of the position of the draft-pole.

The frames G, and consequently the plows H, may be raised and lowered at any time by actuating the shaft I, which can be done by the driver from his seat D.

Having thus described my invention, what I claim as new, and desire to secure by Letters Patent, is—

The draft-pole B, pivoted to the front bar, A, of the machine, as shown at $a$, with its back end resting on the back bar, A', and having the driver's seat D attached to it, substantially as and for the purpose herein set forth.

N. E. SMITH.

Witnesses:
G. P. SMITH,
C. E. BOSS.